(12) United States Patent
Allaire

(10) Patent No.: US 8,998,185 B2
(45) Date of Patent: Apr. 7, 2015

(54) VIBRATION DAMPING DEVICE FOR VERTICALLY CANTILEVERED PUMP ASSEMBLIES

(75) Inventor: Jason Douglas Allaire, Wells, ME (US)

(73) Assignee: Flowserve Management Company, Irving, TX (US)

( * ) Notice: Subject to any disclaimer, the term of this patent is extended or adjusted under 35 U.S.C. 154(b) by 959 days.

(21) Appl. No.: 13/098,674

(22) Filed: May 2, 2011

(65) Prior Publication Data

US 2011/0278777 A1 Nov. 17, 2011

Related U.S. Application Data

(60) Provisional application No. 61/334,278, filed on May 13, 2010.

(51) Int. Cl.
*F16F 7/104* (2006.01)
*F16F 13/00* (2006.01)

(52) U.S. Cl.
CPC .............. *F16F 7/104* (2013.01); *F16F 13/007* (2013.01)

(58) Field of Classification Search
USPC .......................... 267/125, 136, 140.11, 64.13; 188/378–380, 322.5; 415/119; 175/57, 175/220
See application file for complete search history.

(56) References Cited

U.S. PATENT DOCUMENTS

| | | | |
|---|---|---|---|
| 3,483,951 A * | 12/1969 | Bonesho et al. .............. | 188/379 |
| 4,583,912 A | 4/1986 | Ball et al. | |
| 4,922,671 A | 5/1990 | Sato | |
| 5,070,663 A | 12/1991 | Sakai et al. | |
| 5,219,051 A * | 6/1993 | Davis ............................. | 188/378 |
| 5,775,472 A * | 7/1998 | Osterberg et al. ............. | 188/378 |
| 5,915,508 A * | 6/1999 | Lai ................................ | 188/379 |
| 6,340,153 B1 * | 1/2002 | Miesner .................... | 267/140.11 |
| 6,484,469 B2 * | 11/2002 | Drake .......................... | 52/649.2 |
| 6,634,472 B1 * | 10/2003 | Davis et al. .................. | 188/378 |
| 6,695,588 B1 | 2/2004 | Nielsen | |
| 2005/0248071 A1 * | 11/2005 | Ben-Maimon ................ | 267/136 |

FOREIGN PATENT DOCUMENTS

| | | |
|---|---|---|
| EP | 1596072 A2 | 11/2005 |
| JP | 11257296 A | 9/1999 |
| JP | 2003049771 A | 2/2003 |

OTHER PUBLICATIONS

Nekomoto Y., et al., Development of new-type dampers for piping systems, Transactions of the 14th International Conference on Structural Mechanics in Reactor Technology, Aug. 17-22, 1997, Lyon, France.
PCT Search Report and Written Opinion for PCT Application No. PCT/US2011/034254, Dec. 13, 2011, 8 pages.

* cited by examiner

*Primary Examiner* — Robert A Siconolfi
*Assistant Examiner* — Mahbubur Rashid
(74) *Attorney, Agent, or Firm* — Maine Cernota & Rardin

(57) ABSTRACT

A Tuned Mass Damper (TMD) for damping oscillations of a hanging vertical pump structure includes a removable mass symmetrically configured within the pump structure diameter and supported by a mechanism which provides damped mobility relative to the pump structure so as to absorb and dampen pump vibrations and oscillations. The TMD mass is easily removable before tipping of the pump between horizontal and vertical orientations during maintenance. In some embodiments, the TMD mass comprises fluid pumped by the pump to fully or partially fill a housing, the fluid being gravitationally drained therefrom when the pump is not operating. In other embodiments the TMD mass is supplied by removable solid weights. Damped mobility is provided by springs damped by mechanical or fluid friction, or by obstructed movement of fluid within a partially filled housing. In embodiments, the TMD mass is at least 5% of the total mass of the pump structure.

7 Claims, 8 Drawing Sheets

VIBRATION DAMPING DEVICE FOR VERTICALLY CANTILEVERED PUMP ASSEMBLIES

RELATED APPLICATIONS

This application claims the benefit of U.S. Provisional Application No. 61/334,278, filed May 13, 2010, which is herein incorporated by reference in its entirety for all purposes.

FIELD OF THE INVENTION

The invention relates to vertical pumps, and more particularly to devices for damping vibrations of vertical pumps.

BACKGROUND OF THE INVENTION

Vertical pumps are used extensively in industrial applications in wells and other structures where liquids are contained. Oftentimes the contained liquid is highly toxic, corrosive, or is subject to temperature extremes that make an enclosed containment necessary for the protection of nearby personnel and/or the environment. In such hazardous environments, pumps are not readily accessible for observation, troubleshooting, and/or maintenance. It is therefore highly important that vertical pumps used under such conditions be as reliable as possible, especially in industrial applications where it is important to maintain profitability.

Vertical pumps are often of relatively small diameter in comparison to their length. Vertical pumps can be of any length within the confines of acceptable design practices, and are frequently custom built to fit the specific requirements of a particular containment structure. Some vertical pumps include a mounting plate at or near an upper end which is designed to mate with a containment structure, such that the pump extends downward into the containment structure without any other support. In enclosed containment structures such as those holding hazardous liquids, the opening through which a pump is inserted is often quite small because of a need to minimize any emissions from the containment through the opening.

Vertical pumps which are suspended only from above and which include long, unsupported, sections with a low diameter-to-length ratio are prone to oscillation caused by sources such as rotodynamic imbalance and hydrodynamic imbalance, as well as external sources such as seismic disturbances, waves, and/or currents. Such vertical pumps become increasingly susceptible to oscillation as liquid levels are lowered within a containment structure, because of loss of the natural damping action that liquid submergence provides to a vertical pump.

Most vertical pumps are classified as non-rigid structures, in that the operating frequency of the rotor is higher than the $1^{st}$ natural frequency of the pump structure. In some applications, the pump structure can be designed so that it does not have any natural oscillation frequencies which conflict with the operating frequency of the rotor. However, use of variable speed controls in conjunction with vertical pumps often creates a situation where the operating speed of the pump can be brought sufficiently close to a natural oscillation frequency of the pump structure so that undesirable resonances are generated.

Vertical pump resonances can often reach amplitudes which are detrimental to the continuous operation of the pump. If the pump is installed within a containment structure, and is therefore not visible to the operators, the remoteness of the problem, coupled with the incompatibility of many liquids with sensing instrumentation, can result in premature equipment failure without forewarning to the operators. Such an unforeseen failure of a vertical pump can cause loss of production, as well as injury to personnel and damage to ancillary equipment.

One approach to suppressing resonances in vertical pumps is to use a Tuned Mass Damper (TMD). TMD's are well known in the field of harmonic control as a means of damping resonant vibrations by combining a relatively small mass with a spring and damping device so as to dissipate the energy created by an oscillating motion of a larger mass.

When a structure begins to oscillate or sway, movement of the structure is transmitted to a TMD, setting it into an out-of-phase motion by means of the spring. Ideally, the frequencies and amplitudes of the TMD and the structure should nearly match, so that whenever the structure is set in motion, the TMD creates an equal and opposite out-of-phase motion, keeping the horizontal displacement of the structure at or near zero.

The effectiveness of a TMD is dependent on the mass ratio of the TMD to the structure itself, the ratio of the frequency of the TMD to the oscillation frequency of the structure, and the damping ratio of the TMD, i.e. how well the damping device dissipates energy.

Heretofore, TMDs have not been applied to vertical pumps due to the difficulty of designing an effective TMD which can be readily fit through the pump installation opening and contained within the confines provided by the containment structure in which the vertical pump is installed.

Nor has there been a provision in vertical pump design for damping without the addition of appreciable mass to the pump. Unlike permanent vertical structures such as buildings and radio towers, a vertical pump must be routinely removed from its containment structure and transitioned between the vertical orientation in which it operates and a horizontal orientation in which maintenance is performed. Longitudinal alignment is critical to the reliability of a vertical pump, which can be easily prone to bending when force is applied normal to the pump's longitudinal axis. The addition of any large mass to the pump prior to installation necessitates either special provision for lifting or special procedures so as not to introduce detrimental bending forces which would disturb the alignment of the pump while it is being transitioned between the horizontal and vertical orientations.

Instead of attempting to incorporate a vibration damping solution, pump manufactures typically just provide instructions to users advising them to restrict the operational range of the vertical pump so as to avoid generating damaging resonances coincident with the natural frequencies of the pump structure. These limitations are inconvenient to users, and in some cases the operating restrictions can limit the productivity of the vertical pump.

What is needed, therefore, is a vibration damping device for a vertical pump which can prevent the vertical pump from being damaged by structural oscillations and resonances originating from causes such as rotodynamic and/or external sources, and which is compatible with exposure to a broad range of chemicals and environmental conditions. It is further desirable that the vibration damping device be compact and integral to the pump structure, so that it fits within the available space and can be readily inserted through pump installation openings and into enclosed containment structures. Furthermore, it is desirable that the vibration damping device not add appreciable mass to the pump during transition of the pump between horizontal and vertical orientations.

SUMMARY OF THE INVENTION

One general aspect of the present invention is a Tuned Mass Damper (TMD) for a vertical pump structure which uses pump effluent as the damping mass, so that the damping mass is present during operation of the pump but absent when the pump is removed for maintenance. The TMD comprises an annular TMD housing contained within the diameter of the pump structure and flexibly supported by springs and dampers, such that damped movement of the TMD housing is enabled in directions normal to the pump's longitudinal axis. When the pump is operating, the annular housing is filled with the pumped fluid through an inlet flexibly connected to the pump discharge, thereby accumulating sufficient mass within the housing for effective damping of vibrations during pump operation. When the pump is not operating, the additional mass of the pumped fluid flows out of the annular housing through a drain, so that the fluid mass is not present in the TMD during installation, removal, and maintenance of the pump.

Another general aspect of the present invention is a Tuned Mass Damper (TMD) for a vertical pump structure having an annular TMD housing which is only partially filled with pump effluent during pump operation, so that the fluid is able to shift and move within the TMD housing. In this general aspect, TMD housing itself remains fixed in position while the motion of the fluid within the TMD housing absorbs vibration energy during pump operation. When the pump is operating, the annular housing is partially filled with the pumped fluid through an inlet connected to the pump discharge, thereby accumulating the requisite mass for effective damping during operation. However, any gases which initially fill the TMD housing remain trapped inside, thereby preventing the TMD housing from being completely filled with fluid. Because the housing is only partially filled, the fluid is able to move within the housing in response to pump vibrations. Structures within the TMD housing impede movement of the fluid, thereby absorbing energy and damping the vibrations. When the pump is not operating, the additional mass of the pumped fluid flows out of the annular housing through a drain, so that the fluid mass is not present in the TMD during installation, removal, and maintenance of the pump.

Still another general aspect of the present invention is an annular supporting frame which is contained within the diameter of the pump structure and flexibly supported by springs and dampers, such that damped movement of the annular supporting frame is enabled in directions normal to the pump's longitudinal axis. A plurality of removable solid mass elements are attachable to the annular supporting frame so as to provide sufficient mass to effectively damp vibrations. The mass elements, which can be made from metal or from another solid material, are easily removed before the pump is tipped to a horizontal orientation, and then easily reinstalled after the pump has been returned to its vertical orientation.

One general aspect of the present invention is a vibration damping assembly for installation on a vertical pump structure, the vertical pump structure including a vertical pump. The vibration damping assembly includes a fluid housing which is symmetrically locatable about a longitudinal axis of the vertical pump structure so as to fit within a maximum radius of the pump structure, an attachment mechanism suitable for attaching the fluid housing to the vertical pump structure in a manner which allows movement of the fluid housing in at least one direction perpendicular to the longitudinal axis of the vertical pump structure, and at least one damped-spring assembly configured for providing damped-spring resistance to the movement of the fluid housing perpendicular to the longitudinal axis of the vertical pump structure.

The vibration damping assembly further includes an inlet through which fluid can enter the fluid housing, the inlet being in fluid communication with a fluid discharge of the vertical pump so as to fill the fluid housing with fluid when the vertical pump is in operation, a gas venting mechanism configured to allow gas contained in the fluid housing to be expelled as the fluid housing fills with fluid, thereby allowing the fluid housing to be completely filled with fluid when the vertical pump is in operation, and a drain through which the fluid can gravitationally drain from the fluid housing, the fluid housing being thereby drained of fluid when the vertical pump is not in operation.

In various embodiments, the attachment mechanism allows movement of the fluid housing in two orthogonal directions perpendicular to the longitudinal axis of the vertical pump structure.

In some embodiments the vibration damping assembly includes a pair of damped-spring assemblies located on opposing sides of the longitudinal axis of the vertical pump structure and having a common damped-spring longitudinal axis which intersects and is normal to the longitudinal axis of the vertical pump structure.

In other embodiments the damped-spring assembly is damped due to mechanical friction.

In certain embodiments the damped-spring assembly is damped due to flow of a fluid through a restricted opening in the damped-spring assembly. In some of these embodiments the restricted opening is an annular clearance between a cylinder and a piston of the damped-spring assembly. In other of these embodiments the fluid is provided to the damped-spring assembly by fluid flowing into the damped-spring assembly from the fluid housing. And in some of these embodiments the gas venting mechanism enables gas to vent through the damped-spring assembly.

In various embodiments the combined mass of the fluid housing and the fluid contained therein when the housing is filled with fluid is at least 5% of the mass of the vertical pump structure.

Another general aspect of the present invention is a vibration damping assembly for installation on a vertical pump structure, the vertical pump structure including a vertical pump. The vibration damping assembly includes a fluid housing which is rigidly fixable to the vertical pump structure in a configuration which is symmetrically distributed about a longitudinal axis of the vertical pump structure and fits within a maximum radius of the pump structure, and an inlet through which fluid can enter the fluid housing, the inlet being in fluid communication with a fluid discharge of the vertical pump so as to partially fill the fluid housing with fluid when the vertical pump is in operation, a portion of the fluid housing remaining filled with entrapped gas.

The vibration damping assembly further includes at least one obstruction located within the fluid housing and configured so as to resist a flow of fluid contained therein, the at least one obstruction thereby providing damping resistance to the flow of fluid within the fluid housing, and a drain through which fluid can gravitationally drain from the fluid housing, the fluid housing being thereby drained of fluid when the vertical pump is not in operation.

In various embodiments the combined mass of the fluid housing and the fluid contained therein when the pump is operating and the fluid housing is partially filled with fluid is at least 5% of the mass of the vertical pump structure.

Yet another general aspect of the present invention is a vibration damping assembly for installation on a vertical pump structure, the vertical pump structure including a vertical pump. The vibration damping assembly includes a supporting frame which is symmetrically locatable about a longitudinal axis of the vertical pump structure so as to fit within a maximum radius of the pump structure, and an attachment mechanism suitable for attaching the supporting frame to the vertical pump structure in a manner which allows movement of the supporting frame in at least one direction perpendicular to the longitudinal axis of the vertical pump structure.

The vibration damping assembly further includes at least one damped-spring assembly configured for providing damped-spring resistance to the movement of the supporting frame perpendicular to the longitudinal axis of the vertical pump structure, and a plurality of weights, the weights being attachable to the supporting frame in a manner which does not cause the weights to extend beyond the maximum radius of the pump structure, and which distributes the total mass of the weights symmetrically about the longitudinal axis of the vertical pump structure, the weights being detachable from the supporting frame in preparation for reorientation of the vertical pump structure to a horizontal orientation, and the weights being attachable to the supporting frame after reorientation of the vertical pump structure to a vertical orientation.

In various embodiments, the attachment mechanism allows movement of the supporting frame in two orthogonal directions perpendicular to the longitudinal axis of the vertical pump structure.

In some embodiments, the vibration damping assembly includes a pair of damped-spring assemblies located on opposing sides of the longitudinal axis of the vertical pump structure and having a common damped-spring longitudinal axis which intersects and is normal to the longitudinal axis of the vertical pump structure.

In certain embodiments the damped-spring assembly is damped due to mechanical friction.

In some embodiments the damped-spring assembly is damped due to flow of a fluid through a restricted opening in the damped-spring assembly. In some of these embodiments the restricted opening is an annular clearance between a cylinder and a piston of the damped-spring assembly. And in other of these embodiments the fluid is provided to the damped-spring assembly by fluid flowing into the damped-spring assembly from a fluid discharge of the vertical pump.

In various embodiments the weights are made from metal. And in certain embodiments the combined mass of the supporting frame and the plurality of weights is at least 5% of the mass of the vertical pump structure.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

Figure 1:
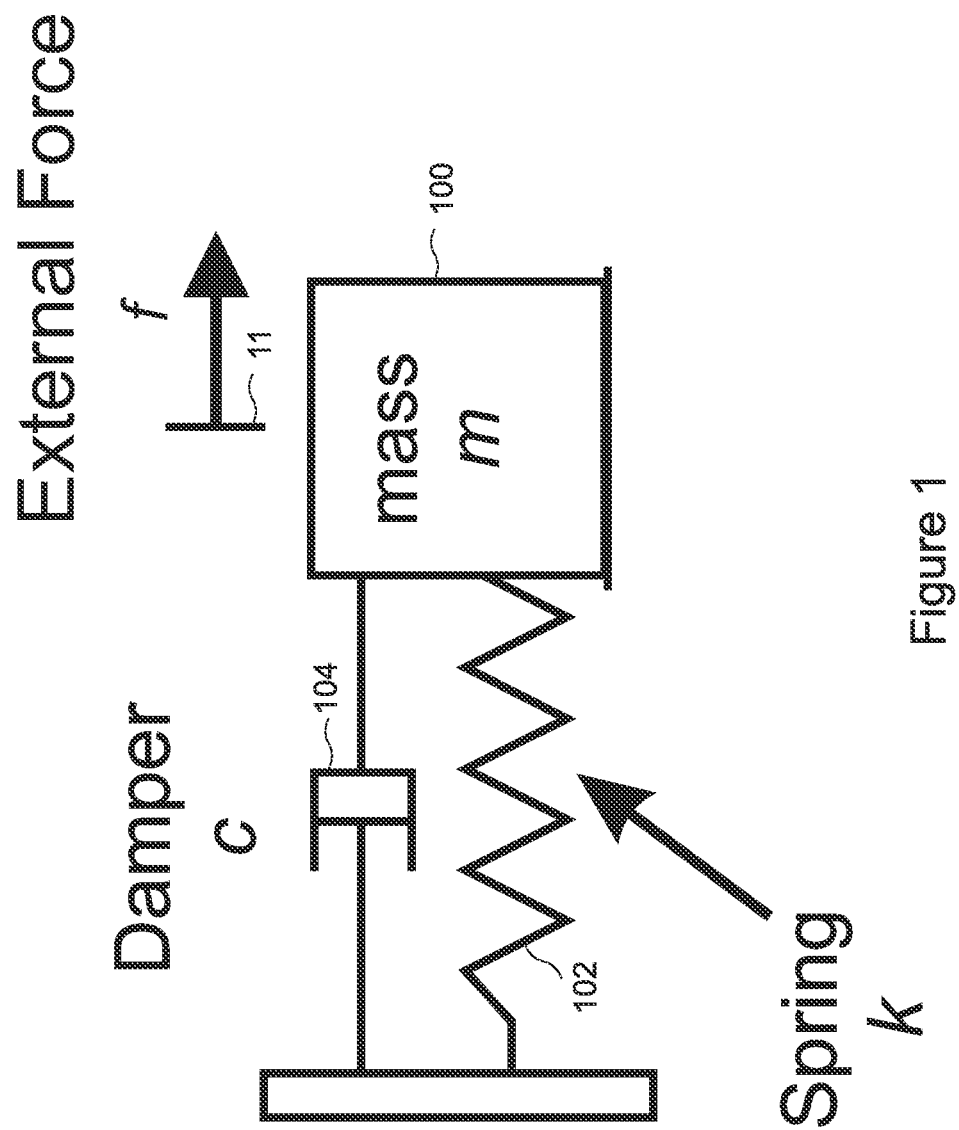
FIG. 1 is functional diagram of a generic TMD system.

FIG. 1 illustrates a mass-spring-damper system with a mass 100 with mass m, a spring 102 with spring constant k, and a viscous damper 104 of damping coefficient c, from which the following parameters can be calculated:

$$\omega_0 = \sqrt{\frac{k}{m}} \tag{1}$$

$$\zeta = \frac{c}{2\sqrt{mk}} \tag{2}$$

where $\omega_0$, is called the undamped natural frequency of the system, and the parameter $\zeta$ is called the damping ratio. The natural frequency $\omega_0$ is an angular frequency expressed in radians per second. The damping ratio is a dimensionless quantity. Empirical studies have shown that the effectiveness of a TMD depends on the mass ratio of the TMD mass 100 to the primary mass.

Figure 2:
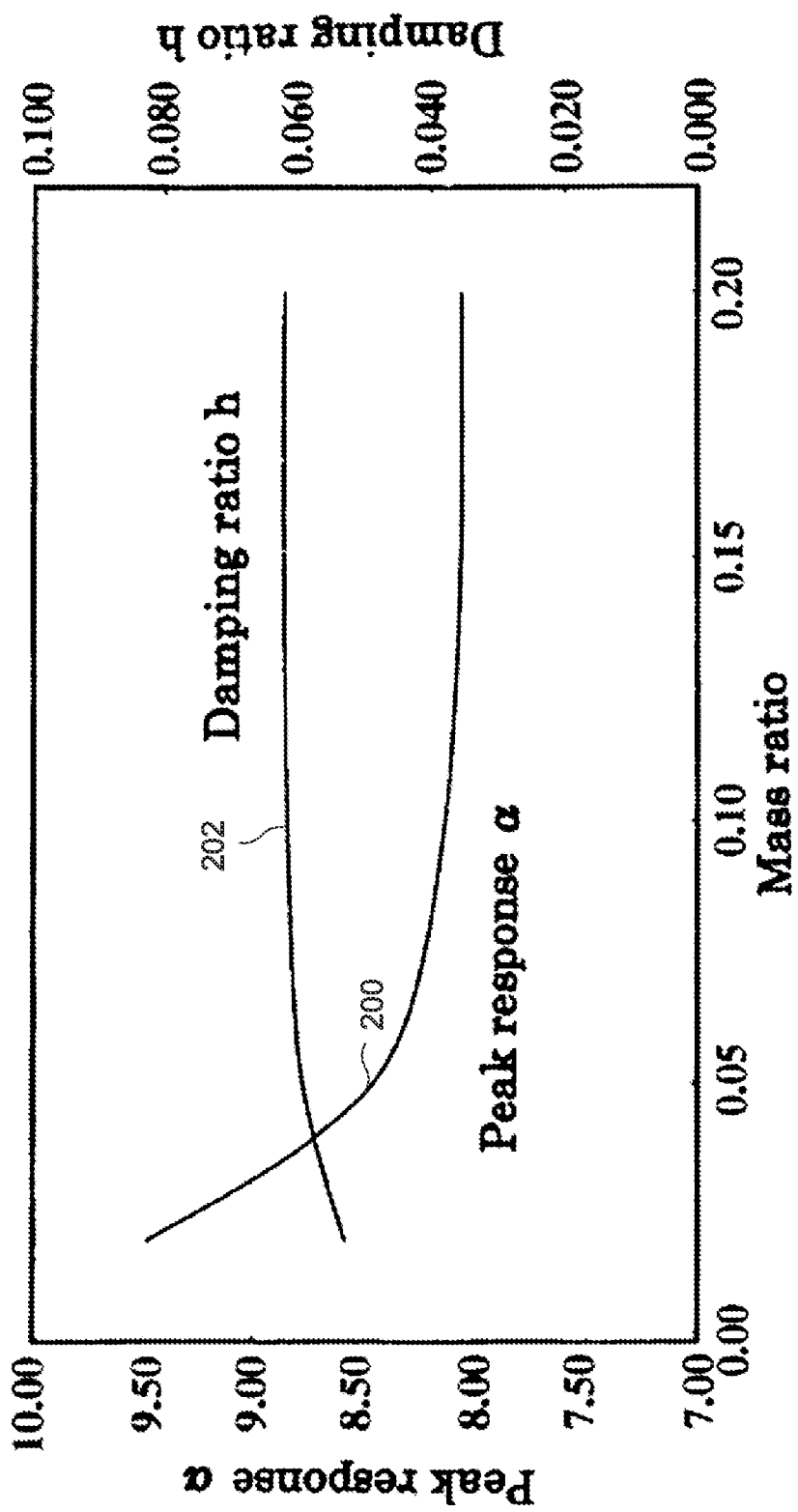
FIG. 2 is a graph showing the relationship between mass ratio and vibration reduction for a TMD.

FIG. 2 is a graph which illustrates the relationship between the mass ratio and the degree of vibration reduction caused by the dynamic absorber. The horizontal axis shows the mass ratio, one vertical axis shows the peak response a 200, which is the maximum value of each frequency response function, and the other vertical axis shows the damping ratio h 202 of a main system (piping system) after the dynamic absorber is set up. The best tuning is achieved when the damping ratio h 202 is approximately 6%. The relationship between the peak response a 200 and the damping ratio h 202 is given as follows:

$$a = \frac{1}{2}h. \tag{3}$$

FIG. 2 shows that sufficient damping ratio 202 and vibration reduction (reduced peak response 200) are achieved with a mass ratio of about 5%. Therefore, it is generally considered that a mass ratio of about 5% for a dynamic absorber is suitable for effective damper design.

Figure 3:
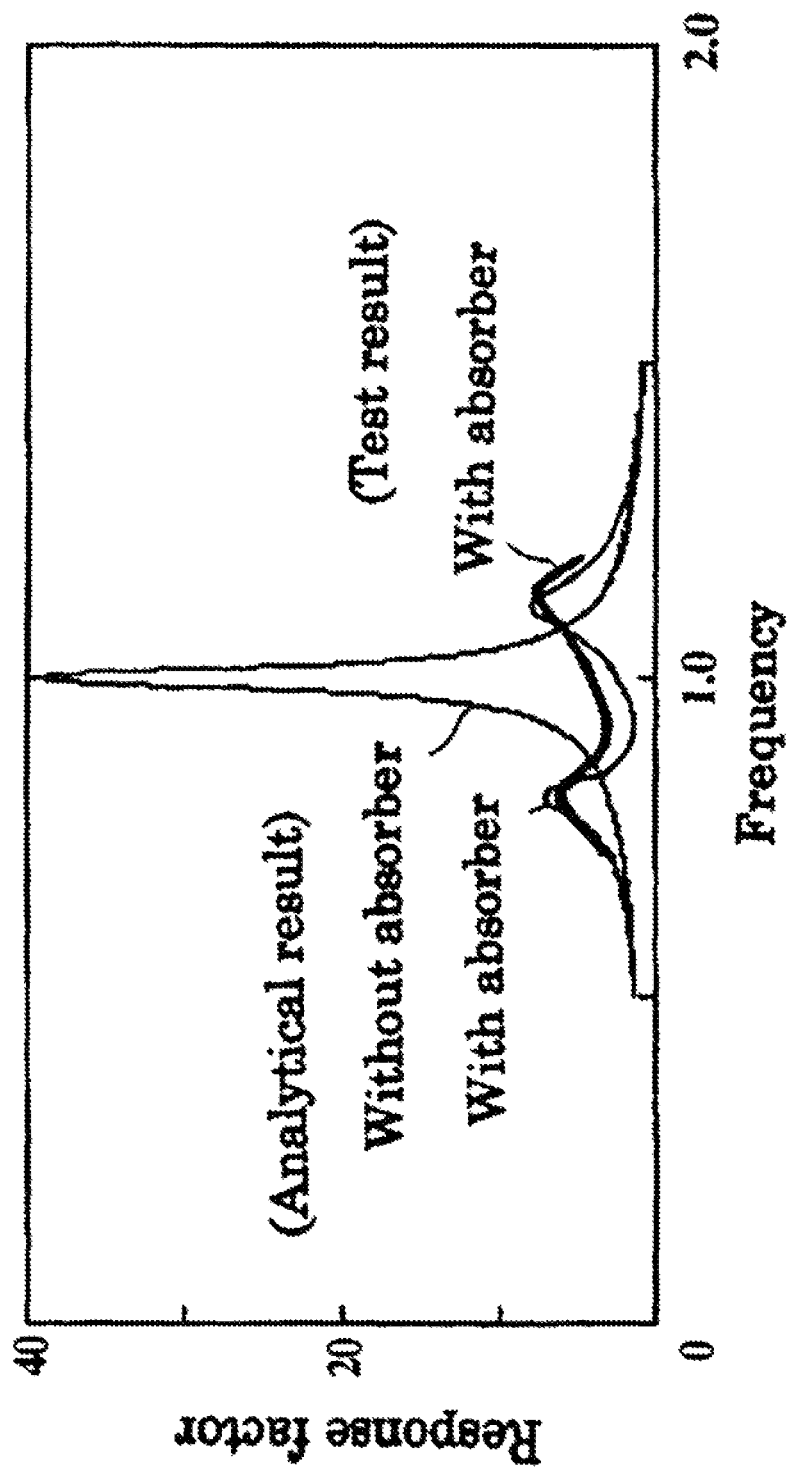
FIG. 3 is a graph showing frequency response characteristics for a tuned mass damper.

FIG. 3 illustrates the response characteristic of a TMD which effectively prevents damaging, undamped, high amplitude oscillations from occurring.

Figure 4:
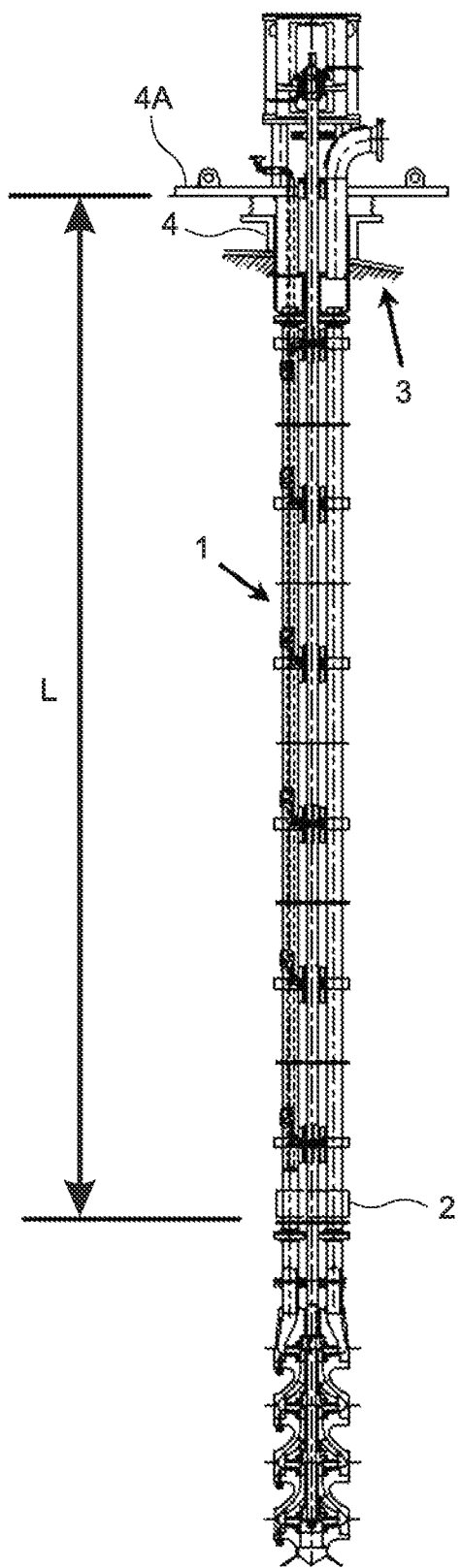
FIG. 4 is a side view of a vertical pump assembly equipped with a TMD embodiment of the present invention and installed within a containment structure.

FIG. 4 is diagrammatic view wherein vertical pump assembly 1 is insertably mounted into containment structure 3 through opening 4. An embodiment of the present invention, TMD 2, is integrally mounted to the vertical pump assembly 1 at an axial distance L beneath pump cover plate 4A, and is designed such that the diameter of TMD 2 is small enough to pass through opening 4 of containment structure 3.

Figure 5:
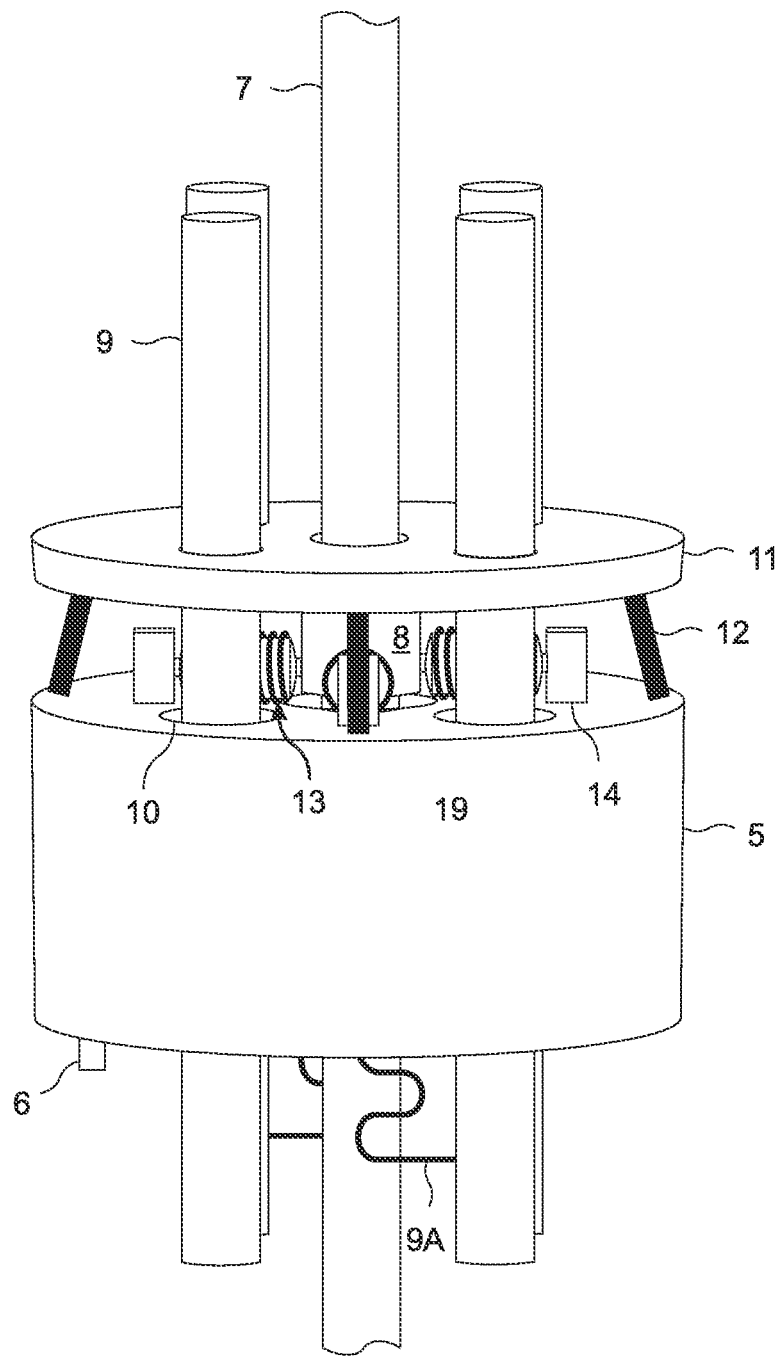
FIG. 5 is a perspective view of an annular, liquid-charged TMD embodiment of the present invention.
Figure 6:
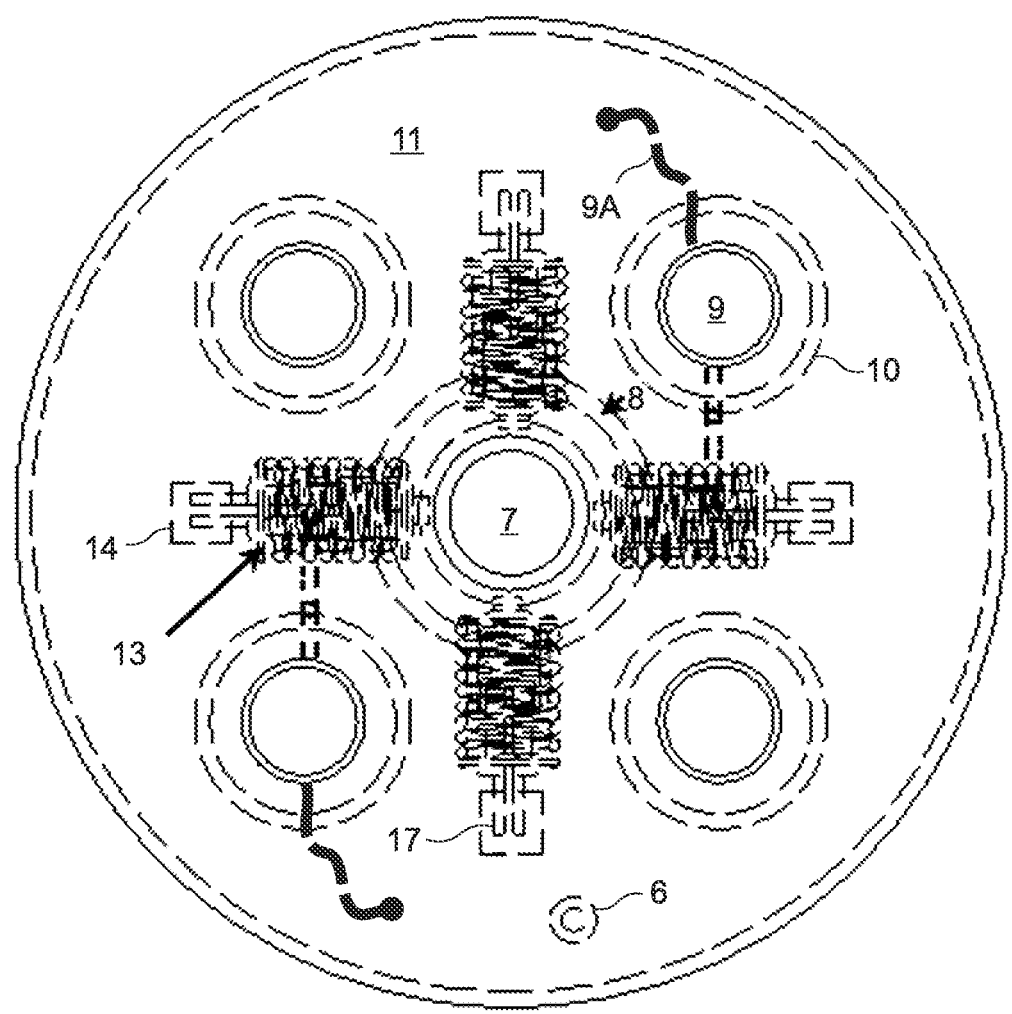
FIG. 6 is a top view of an annular, liquid-charged TMD embodiment of FIG. 5.

Referring to FIG. 5, which depicts a more detailed perspective view of an annular TMD in an embodiment of the present invention, and FIG. 6, which depicts a top view of the annular TMD of FIG. 5, the damping device in this embodiment comprises an enclosed annular container 5 with a bottom drain opening 6. Pump drive shaft 7 is coaxial with and passes through cylindrical passage 8 and is coaxial with the vertical axis of enclosed annular container 5. Pump discharge lines 9 are coaxial with cylindrical annular openings 10 which are parallel to and arranged in a circular pattern around the central axis of annular container 5 and pump drive shaft 7. In various embodiments, other arrangements are used without departing from the scope of the present invention, such as an annular container having a pump drive shaft 7 and discharge lines 9 passing through a single, central coaxial opening. In the embodiment of FIGS. 5 and 6, annular container 5 is vertically suspended from intermediate support plate 11 by means of suspension cables, hinged rods, or some other flexural means 12 known in the art. Spring absorbers 13 communicate with the contents of annular container 5 through feeder blocks 14 and inlet 17.

Figure 7:
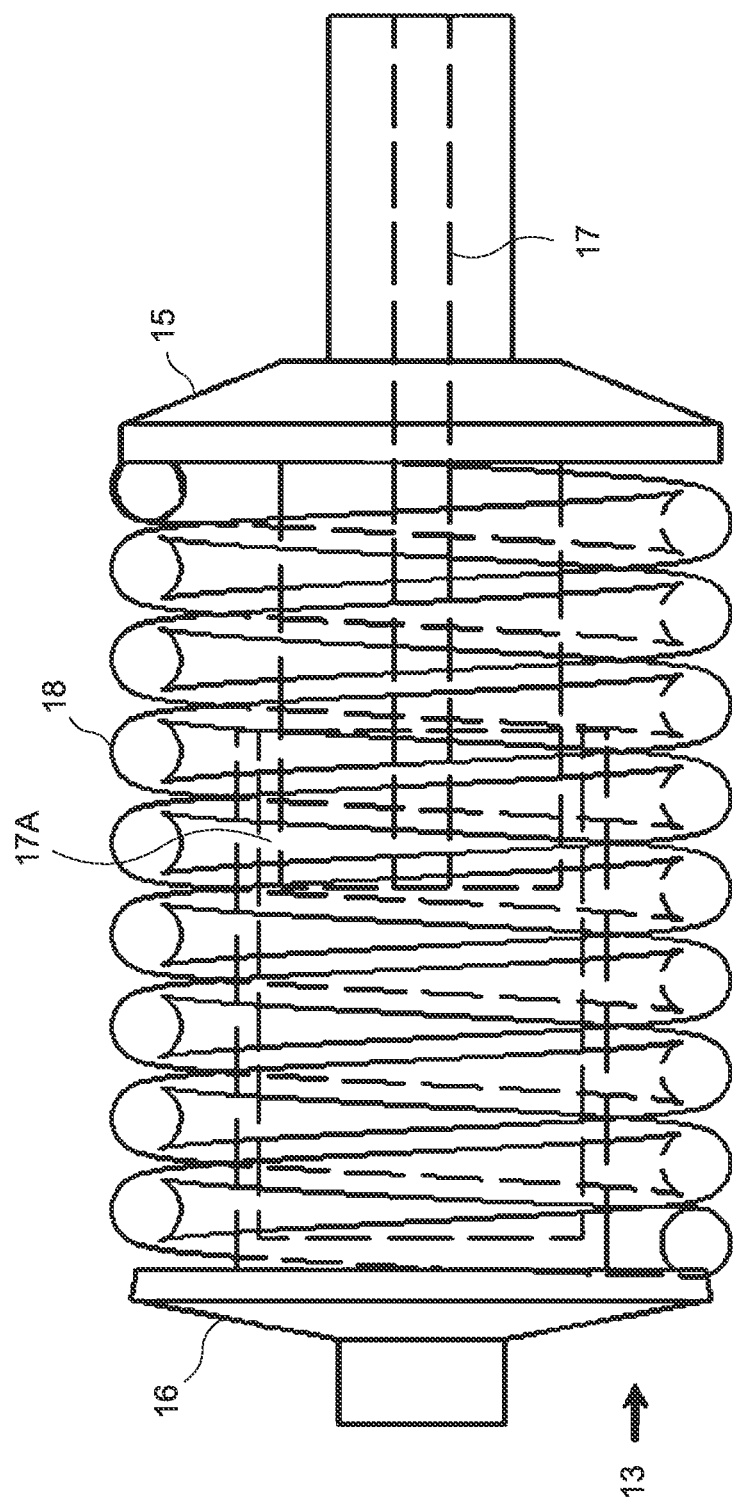
FIG. 7 is a cross-sectional side view of a spring-absorber of an embodiment of the present invention.

Referring to FIG. 7, spring absorber 13 is similar in construction to an automotive hydraulic shock absorber, with piston 15 extending coaxially into a cylinder 16 with a sliding clearance fit 17A. Piston 15 is bored throughout its central axis. Inlet 17 of piston 15 is provided, so that fluid can enter spring absorber 13 via a passage in feeder block 14 which communicates with annular container 5. The cross-sectional area of piston 15 is greater than the cross-sectional area of the annular fluid passage formed by the clearance volume 17A between piston 15 and cylinder 16 and the cross-sectional area of inlet 17. Spring 18 is mounted coaxial to and mechanically attached to both cylinder 16 and piston 15. A plurality of spring absorbers 13 are arrayed in a circular pattern around the longitudinal axis of pump assembly 1, being normal to and directed radially outward from the longitudinal axis of pump assembly 1, with the longitudinal axis of each spring absorber 13 intersecting the longitudinal axis of pump assembly 1. Furthermore, each of the spring absorbers 13 is coaxial with a diametrically opposed spring absorber 13. Flexible supply lines 9A communicate with discharge pipes 9 and annular container 5.

During installation or removal, pump assembly 1 can be transitioned by suitable means between horizontal and vertical for insertion into, or removal from the containment structure 3. Annular container 5 remains empty when pump assembly 1 is not in operation, greatly reducing the weight of the pump assembly during this installation process. When pump assembly 1 begins operation, discharge line(s) 9 become pressurized with fluid, and a portion of the pumped fluid (not shown) is diverted through flexible conduit 9A to annular container 5. The pressurized fill rate of annular container 5 is greater than the gravity drain rate of the fluid from bottom drain opening 6, such that annular container 5 is filled with pumped fluid. During the filling process, gas in annular container 5 is expelled through the annular clearance volume 17A between piston 15 and cylinder 16, which communicates with annular chamber 5 through inlet 17 and feeder block 14, until such time as annular container 5 becomes completely filled with pumped fluid. Accordingly, the annular clearance 17A functions in this embodiment as a gas venting mechanism. Once annular container 5 is filled with fluid, excess fluid continues to exit through drain 6, and through the annular clearance volume 17A between piston 15 and cylinder 16. Annular chamber 5 thus remains full of fluid as long as the pump is operating. Whenever pump assembly 1 stops operation, fluid ceases to flow into annular chamber 5, and any entrained fluid drains out through bottom drain opening 6.

If the pump experiences vibrations or oscillations normal to its longitudinal axis, the excitation forces are transmitted through spring 18 of spring absorber 13. The combined mass of annular chamber 5 and the pumped fluid it contains resists this motion in accordance with Newton's second law, causing spring 18 to be compressed and piston 15 to stroke within cylinder 16. The differential cross-sectional area between piston 15, inlet 17, and the annular clearance volume 17A between piston 15 and cylinder 16 creates a fluid-friction damping effect which is proportional to the acceleration of piston 15, thereby absorbing energy and preventing harmonic resonance from occurring, as is graphically depicted in FIG. 3.

In another general aspect of the present invention (not shown), annular chamber 5 has no vent, so that gas is trapped within annular chamber 5 and it is only partly filled with fluid. In these embodiments there is no spring absorber 13. Instead, the free surface effect of the fluid within annular chamber 5 is used to achieve the desired damping. Flexible conduit 9A connects discharge pipe 9 to annular chamber 5, and annular container 5 is rigidly affixed to support plate 11 or pump assembly 1.

In this general aspect, during installation or removal, pump assembly 1 can be transitioned by suitable means between horizontal and vertical orientations for insertion into or removal from the containment structure 3. Annular container 5 remains empty when pump assembly 1 is not in operation, greatly reducing the weight of the pump assembly during this installation process. When pump assembly 1 begins operation, discharge line(s) 9 become pressurized with fluid, and a portion of the pumped fluid (not shown) is diverted through flexible conduit 9A to annular container 5. The pressurized fill rate of annular container 5 is greater than the gravity drain rate of the fluid from bottom drain opening 6, such that annular container 5 is partially filled with pumped fluid. During the filling process, gas in annular container 5 is trapped, creating a vapor space above the fluid within annular container 5. Annular container 5 thus remains partially filled with fluid as long as the pump is operating. Whenever pump assembly 1 ceases operation, fluid stops flowing into annular chamber 5, and any entrained fluid mass drains out through bottom drain opening 6.

In this general aspect, whenever the pump experiences oscillation normal to its longitudinal axis, the excitation forces are transmitted directly to rigidly affixed annular container 5. The mass of the pumped fluid contained within annular container 5 resists this motion in accordance with Newton's second law of motion, and the free surface available to the fluid within annular container 5 causes the center of gravity of the fluid mass to move in a direction opposite to the excitation force. Cylindrical obstructions formed by cylindrical passage 8 and cylindrical annular openings 10 resist this free surface effect and thus create a damping response proportional to the acceleration of annular container 5, preventing harmonic resonance from occurring, as graphically depicted in FIG. 3. In similar embodiments, obstructions of other types and sizes are included within annular container 5, so as to resist movement of the fluid and absorb the energy of the vibrations.

Figure 8:
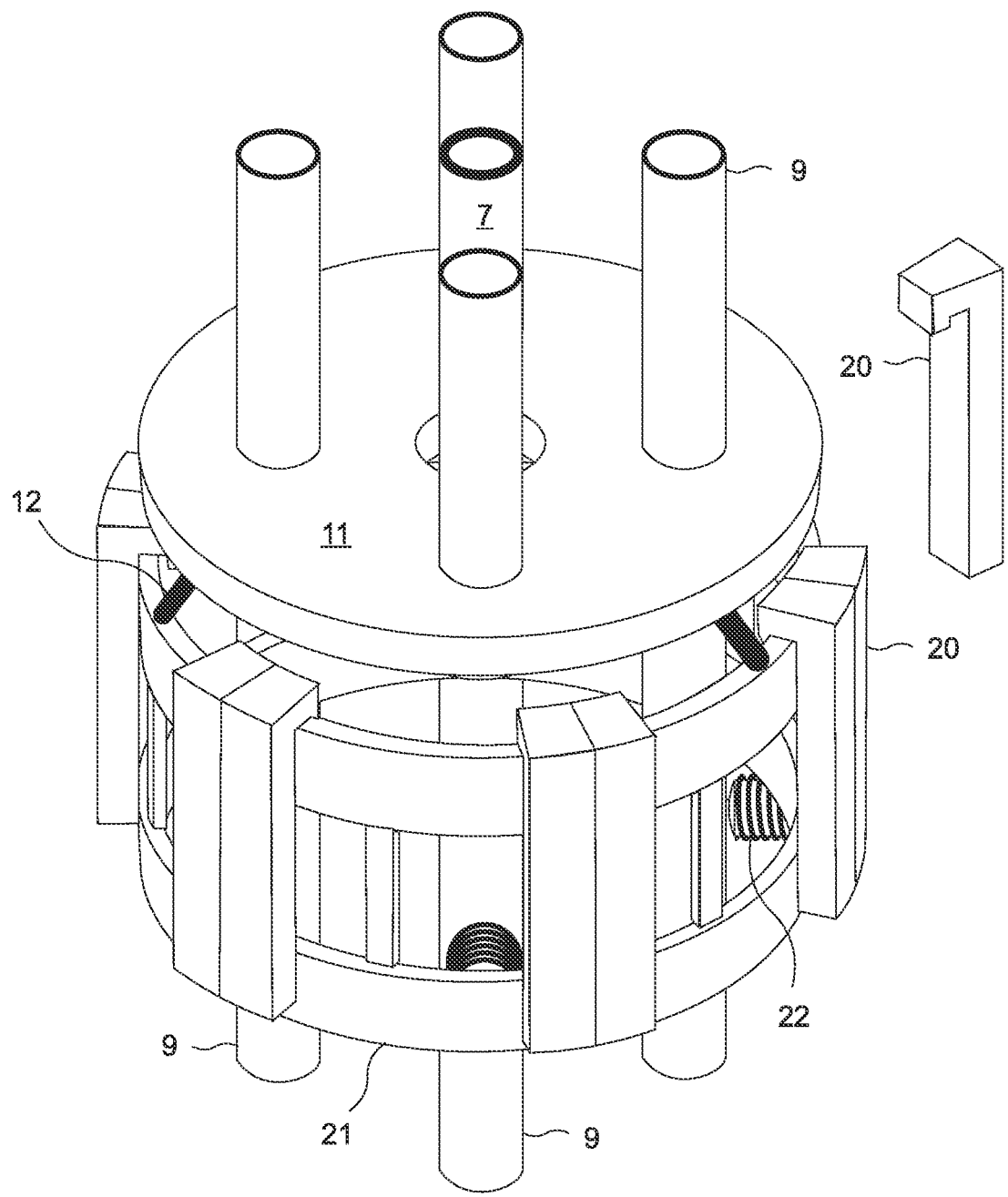
FIG. 8 is a perspective view of a TMD embodiment of the present invention which includes removable solid weights.

With reference to FIG. 8, in yet another general aspect of the invention, solid metal weights 20 are arrayed around carrying frame 21 and affixed thereto by some suitable means, such as bolting (not shown). Carrying frame 21 is coaxial with pump assembly 1 and is vertically suspended from intermediate support plate 11 by cables or by some other flexural means 12 known in the art. Spring absorber 22 is similar to spring absorber 13, forming a conduit means to supply pumped fluid to cylinder 16. In similar embodiments, a flexible supply connection connects discharge line 9 directly to cylinder 16, thereby eliminating the need for a bored passage altogether. In the embodiment of FIG. 8, the longitudinal axis of spring absorber 22 is normal to the longitudinal axis of pump assembly 1. A plurality of spring absorbers 22 extend from pump assembly 1 to carrying frame 21, and are arrayed in a circular pattern such that they can absorb movement along a plurality of axis. For example, FIG. 8 depicts spring absorbers extending from discharge pipes 9 to carrying frame 21, with the longitudinal axes of spring absorbers 22 intersecting the longitudinal axis of discharge pipes 9, pump assembly 1, and carrying frame 21. The central bores 17 of spring assemblies 22 are in communication with the bores of discharge pipes 9, either directly, or indirectly through flexible connections (not shown).

During installation, pump assembly 1 one can be tipped by suitable means from a horizontal orientation to a vertical orientation for insertion into the containment structure 3. Once the pump assembly 1 is vertical, the solid metal weights 20 can be individually affixed to carrying frame 21 until the combined mass of solid metal weights 20 and the carrying frame 21 is at least 5% of the total cantilevered mass of pump assembly 1.

When pump assembly 1 begins operation, discharge line(s) 9 become pressurized with fluid. A portion of the pumped fluid (not shown) is diverted to the central bores of spring absorbers 22, hydraulically filling and pressurizing them, with any leakage exiting through the clearance volume 17A between piston 15 and cylinder 16.

Whenever pump assembly 1 experiences oscillation normal to its longitudinal axis, the excitation forces are transmitted through springs 18 of spring absorbers 22. The combined mass of support structure 21 and the solid metal weights 20 resists this motion in accordance with Newton's second law of motion, causing springs 18 to compress and pistons 15 to stroke with cylinders 16. The differential cross-sectional area between piston 15 and the clearance volume 17A between piston 15 and cylinder 16 creates a fluid friction damping response which is proportional to the acceleration of piston 15. This prevents harmonic resonance from occurring, as is graphically illustrated in FIG. 3.

Although a combination of a spring and fluid friction is used in the spring absorber as a damping means in two of the above described embodiments, damping in those embodiments can also be achieved through a combination of a spring and mechanical friction, so as to dampen the oscillations of pump assembly 1. It should be understood that use of alternate methods for applying spring and friction dampers known to those familiar with the art remain within the scope of the present invention.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A vibration damping assembly for installation on a vertical pump structure, the vertical pump structure including a vertical pump, the vibration damping assembly comprising:
    a fluid housing which is symmetrically locatable about a longitudinal axis of the vertical pump structure and fits within a maximum radius of the pump structure;
    an attachment mechanism suitable for attaching the fluid housing to the vertical pump structure in a manner which allows movement of the fluid housing in at least one direction perpendicular to the longitudinal axis of the vertical pump structure;
    at least one damped-spring assembly configured for providing damped-spring resistance to the movement of the fluid housing perpendicular to the longitudinal axis of the vertical pump structure;
    an inlet through which fluid can enter the fluid housing, the inlet being in fluid communication with a fluid discharge of the vertical pump and being configured to fill the fluid housing with fluid when the vertical pump is in operation;
    a gas venting mechanism configured to allow gas contained in the fluid housing to be expelled as the fluid housing fills with fluid, thereby allowing the fluid housing to be completely filled with fluid when the vertical pump is in operation; and
    a drain through which the fluid can gravitationally drain from the fluid housing, the fluid housing being thereby drained of fluid when the vertical pump is not in operation.

2. The vibration damping assembly of claim 1, wherein the attachment mechanism allows movement of the fluid housing in two orthogonal directions perpendicular to the longitudinal axis of the vertical pump structure.

3. The vibration damping assembly of claim 1, wherein the vibration damping assembly includes a pair of damped-spring assemblies located on opposing sides of the longitudinal axis of the vertical pump structure and having a common damped-spring longitudinal axis which intersects and is normal to the longitudinal axis of the vertical pump structure.

4. The vibration damping assembly of claim 1, wherein a fluid is provided to the damped-spring assembly by fluid flowing into the damped-spring assembly from the fluid housing.

5. The vibration damping assembly of claim 1, wherein a combined mass of the fluid housing and the fluid contained therein when the housing is filled with fluid is at least 5% of a mass of the vertical pump structure.

6. A vibration damping assembly for installation on a vertical pump structure, the vertical pump structure including a vertical pump, the vibration damping assembly comprising:
    a fluid housing which is rigidly fixable to the vertical pump structure in a configuration which is symmetrically distributed about a longitudinal axis of the vertical pump structure and fits within a maximum radius of the pump structure;
    an inlet through which fluid can enter the fluid housing, the inlet being in fluid communication with a fluid discharge of the vertical pump and being configured to partially fill the fluid housing with fluid when the vertical pump is in operation, a portion of the fluid housing remaining filled with entrapped gas;
    at least one obstructing feature of the fluid housing that resists a flow of fluid contained therein, the at least one obstructing feature thereby providing damping resistance to the flow of fluid within the fluid housing; and
    a drain through which fluid can gravitationally drain from the fluid housing, the fluid housing being thereby drained of fluid when the vertical pump is not in operation.

7. The vibration damping assembly of claim 6, wherein the combined mass of the fluid housing and the fluid contained therein when the pump is operating is at least 5% of the mass of the vertical pump structure.

* * * * *